(12) United States Patent
Li et al.

(10) Patent No.: US 8,789,032 B1
(45) Date of Patent: Jul. 22, 2014

(54) FEEDBACK-DIRECTED INTER-PROCEDURAL OPTIMIZATION

(75) Inventors: Xinliang David Li, Sunnyvale, CA (US); Raksit Ashok, Sunnyvale, CA (US); Robert Hundt, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 1129 days.

(21) Appl. No.: 12/395,582

(22) Filed: Feb. 27, 2009

(51) Int. Cl.
*G06F 9/45* (2006.01)

(52) U.S. Cl.
USPC .................... 717/154; 717/158; 717/151

(58) Field of Classification Search
USPC .......................... 717/151, 154, 158
See application file for complete search history.

(56) References Cited

U.S. PATENT DOCUMENTS

| | | | | | |
|---|---|---|---|---|---|
| 5,842,017 | A | * | 11/1998 | Hookway et al. | 717/158 |
| 5,920,723 | A | * | 7/1999 | Peyton et al. | 717/157 |
| 5,966,539 | A | * | 10/1999 | Srivastava | 717/156 |
| 6,158,049 | A | * | 12/2000 | Goodwin et al. | 717/158 |
| 6,971,091 | B1 | * | 11/2005 | Arnold et al. | 717/145 |
| 7,086,044 | B2 | * | 8/2006 | Hanson et al. | 717/151 |
| 8,037,465 | B2 | * | 10/2011 | Tian et al. | 717/158 |
| 2005/0097533 | A1 | * | 5/2005 | Chakrabarti et al. | 717/144 |
| 2005/0188363 | A1 | * | 8/2005 | Moon et al. | 717/157 |
| 2005/0204349 | A1 | * | 9/2005 | Lewis et al. | 717/162 |
| 2005/0262491 | A1 | * | 11/2005 | Gu | 717/151 |
| 2006/0107258 | A1 | * | 5/2006 | Takabatake | 717/151 |
| 2009/0313600 | A1 | * | 12/2009 | Ayers et al. | 717/106 |

\* cited by examiner

*Primary Examiner* — Li B Zhen
*Assistant Examiner* — Viva Miller
(74) *Attorney, Agent, or Firm* — Honigman Miller Schwartz and Cohn LLP

(57) ABSTRACT

Methods, systems, and apparatus, including computer program products, for inter-procedural optimization, are disclosed. In one aspect, a first executable program module is generated based on a plurality of source code modules. Profile information is collected for the plurality of source code modules by executing the first executable program module. Inter-procedural analysis for the plurality of source code modules is performed during execution of the first executable program module. The inter-procedural analysis is based on the collected profile information. IPO is performed based on the results from the inter-procedural analysis to generate a plurality of object code modules. A second executable program module is generated based on the plurality of object code modules.

15 Claims, 12 Drawing Sheets

FEEDBACK-DIRECTED INTER-PROCEDURAL OPTIMIZATION

BACKGROUND

Modern computer programs are typically written in a high-level programming language. A high-level programming language allows data structures and algorithms in a computer program to be expressed in a form that can be easily read and understood by a human programmer. A special software tool, called a "compiler," can translate a computer program written in a high-level programming language into a set of low-level machine instructions that can be executed by a computer's microprocessor. In the context of this translation, the program written in the high-level programming language is called the "source code." The set of low-level machine instructions is called "object code." In practice, a program typically includes multiple source code files from which a number of object files can be derived. These multiple object files and various libraries that include standard routines can be linked (i.e., combined) by a "linker" to create a single executable program. The executable program can then be executed on a computer.

As modern computer programs grow larger and more complex, the sequencing and placement of machine instructions in an executable program greatly affect the efficiency and speed of the program's execution. Modern compilers often include various optimization options that users can selectively enable during program compilation to produce better performing object code. The scope of code optimization can be intra-procedural (i.e., within a single procedure or code block) or inter-procedural (i.e., across multiple procedures or even multiple source code files). Common optimization techniques include loop optimization, data flow optimization, dead code elimination, inline expansion, constant propagation, and so on.

SUMMARY

This specification describes technologies related to inter-procedural optimization (IPO) of computer programs.

In one aspect, a first executable program module is generated based on a plurality of source code modules. Profile information for the plurality of source code modules is collected by executing the first executable program module. The profile information includes information pertaining to invocation of procedures in the first executable program module. Module grouping information for the plurality of source code modules is determined based on procedure invocation patterns in the profile information and according to one or more IPO heuristics. IPO is performed based on the module grouping information to generate a plurality of object code modules. A second executable program module is generated based on the plurality of object code modules.

In some implementations, information pertaining to invocation of procedures includes one or more of an edge frequency count and an indirect call target count.

In some implementations, profile information is gathered using a sampling profiler during execution of the first executable program module.

In some implementations, a dynamic call graph is created during execution of the first executable program module. The dynamic call graph includes nodes and edges. Each node represents a procedure defined by one of the plurality of source code modules. Each edge connects a caller node and a callee node, and represents a procedural call from a caller procedure of a first source code module to a callee procedure of a second source code module.

In some implementations, in determining module grouping information, a module group is created for each source code module in the plurality of source code modules. For each of the source code modules, the source code module is designated as a primary module of the module group. All auxiliary modules of the module group are identified. Each of the identified auxiliary modules defines a callee procedure that is called by a caller procedure in the primary module of the module group.

In some implementations, for each procedure in the primary module, all outgoing edges of the procedure that have an edge frequency count exceeding a threshold value are identified. Each of the outgoing edges represents a procedural call from the procedure to a second, different procedure. For each of the identified outgoing edges, a callee procedure associated with the identified outgoing edge is identified. Then a defining source code module for the identified callee procedure is also identified. The identified defining source code module is designated as an auxiliary module of the primary module if the identified defining source code module has not already been so designated.

In some implementations, when performing IPO based on the module grouping information, a source code module in the plurality of source code modules is identified. Auxiliary modules of the source code module are identified based on the module grouping information. Code transformation is performed on the source code module based on the identified auxiliary source code modules to create an optimized object code module according to the one or more IPO heuristics.

In some implementations, procedures from the identified auxiliary source code modules are inlined into the identified source code module in the plurality of source code modules.

In one aspect, a first executable program module is generated based on a plurality of source code modules. Profile information is collected for the plurality of source code modules by executing the first executable program module. Inter-procedural analysis for the plurality of source code modules is performed during execution of the first executable program module. The inter-procedural analysis is based on the collected profile information. IPO is performed based on the results from the inter-procedural analysis to generate a plurality of object code modules. A second executable program module is generated based on the plurality of object code modules.

Particular embodiments of the subject matter described in this specification can be implemented to realize one or more of the following advantages.

This specification discloses techniques for achieving many benefits of Inter-procedural Optimization IPO (particularly cross-module inlining) without the need to generate and store intermediate representations (IRs) of the source files, or delay inter-procedural analysis until link-time. Generation, storage of IRs for use at link-time cause significant I/O and storage overhead, elimination of the need for IR files greatly improves the compile time.

These techniques utilize the dual-phase feedback-directed compilation model of conventional feedback-directed optimization (FDO) for inter-procedural analysis and optimization. By moving some important inter-procedural analysis (such as inline analysis) into the profile generation phase of a feedback-directed compilation process, both profile data for individual source code modules and the inter-procedural analysis results (such as module grouping information needed for cross-module inlining) can be obtained at the end of the profile generation phase. During the profile use phase of the feedback-directed compilation process, the profile data and the inter-procedural analysis results (such as the module grouping information needed for cross-module inlining) can be utilized for both single module optimization and inter-procedural optimization across multiple modules or on a whole program level. Build parallelism can be enabled by processing the different module groups in parallel.

Cross-module inline is among one of the most important IPO techniques, however, other IPO techniques, such as inter-procedural constant propagation, global variable analysis, inter-procedural register allocation, inter-procedural pointer and alias analysis, data layout optimization, can be implemented in this feedback-directed IPO framework.

Systems and apparatus, including computer program products corresponding to the methods are also disclosed.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
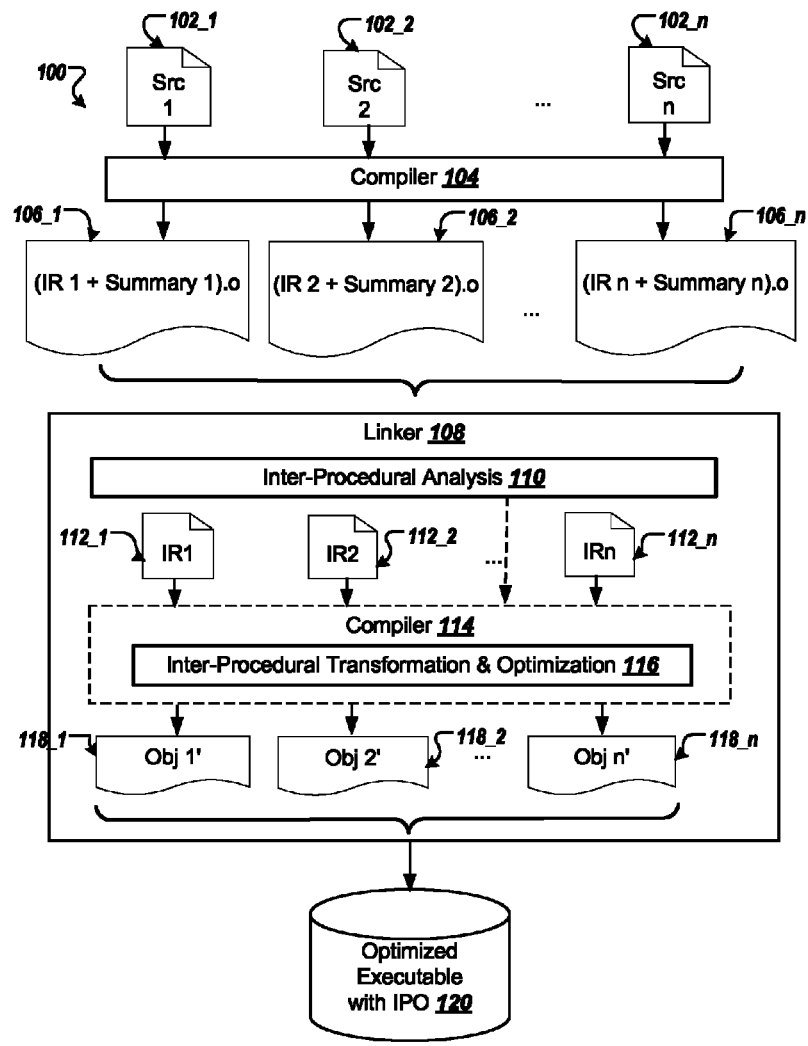
FIG. 1 is a block diagram illustrating a prior art IPO system.

FIG. 1 illustrates the processing of a set of source code modules ($102\_1, 102\_2, \ldots,$ and $102\_n$) in a prior art inter-procedural optimization (IPO) system 100. The generation of optimized executable program 120 in the conventional IPO system 100 is typically divided into three stages: a front-end stage, an inter-procedural analysis stage, and a backend stage. In the front-end stage, a compiler 104 reads in the set of source code modules ($102\_1, 102\_2, \ldots,$ and $102\_n$) at compile time. A compiler front-end analyzes the source code modules to build an intermediate representation (IR) for each source code module. The compiler front-end also creates summary data for each of the source code modules. Common summary data include IR symbol table, type table, callsite table, analysis specific data such as inter-procedural constant propagation (ICP) jump functions, and so on. When the IPO option of the compiler 140 is enabled, the compiler 140 generates "mock object files" ($106\_1, 106\_2, \ldots,$ and $106\_n$) that include the source files' IRs and summary data wrapped in the target system's object file format (e.g., Executable Linkable Formate (ELF)). In some implementations, the compiler 140 also generates so called "fat object files" which include regular relocatable object files with additional data sections carrying the summary data and the IRs.

The primary goal for the front-end stage in the IPO system 100 is to collect the IRs and summary data of all source code modules needed for the inter-procedural analysis stage. In the inter-procedural analysis stage, the "mock object files" or "fat object files" are read in by a linker 108. An inter-procedural analysis mechanism 110 in a linker 108 performs the inter-procedural analysis for the entire program based on the summary data and the IRs. Typical inter-procedural analyses include control flow analysis, alias/pointer analysis, mod/ref analysis, and other data flow analysis. The inter-procedural analyses are aimed at identifying dead-code, duplicate calculations, inefficient use of memory, indirect procedural calls, iterative sequences, and other optimization opportunities on a whole program level. This process can take a long time due to a low level of parallelism in the analysis.

The results of the inter-procedural analyses are then used to guide the transformation and optimization of the IRs to create optimized object code modules in a back-end stage. In the back-end stage, the linker 108 triggers the compiler backend to transform the IRs into functionally equivalent but faster (or smaller) forms. Each invocation of the backend driver is fed with a subset of IRs plus program data containing the inter-procedural analysis result. The backend driver performs the transformation on the IRs and translates them into optimized object code modules ($118\_1, 118\_2, \ldots, 118\_n$). Popular optimization transformations include inline expansion, dead code elimination, constant propagation, loop transformation, register allocation, automatic parallelization, and so on. Once the set of optimized object code modules are produced, the backend driver returns control to the linker 114. The linker 114 then links the optimized object code modules and any referenced libraries to produce the final optimized executable program module 120.

The IPO system 100 depends on the generation and storage of IR files. An IR in object file format is typically three to six times the size of a regular relocatable object file, for example. For large programs, conventional IPO compilation imposes unacceptable compilation overhead not only in terms of disk storage, but also in terms of compile time due to the excessive I/O involved. In addition, the inter-procedural analysis in a conventional IPO system requires all modules to be present at link time, resulting in loss of build parallelism.

Feedback-directed optimization (FDO) is technique for using profile data collected about a program's execution to guide a new compilation process to produce an improved version of the program. Conventional FDO is a dual-phase process, a profile generation phase and a profile use phase.

Figure 2B:
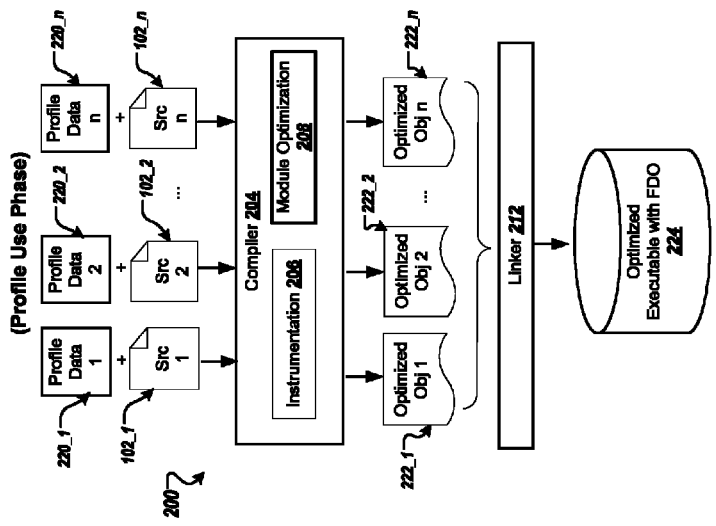
FIG. 2B is a block diagram illustrating a prior art FDO system during the profile use phase.
Figure 2A:
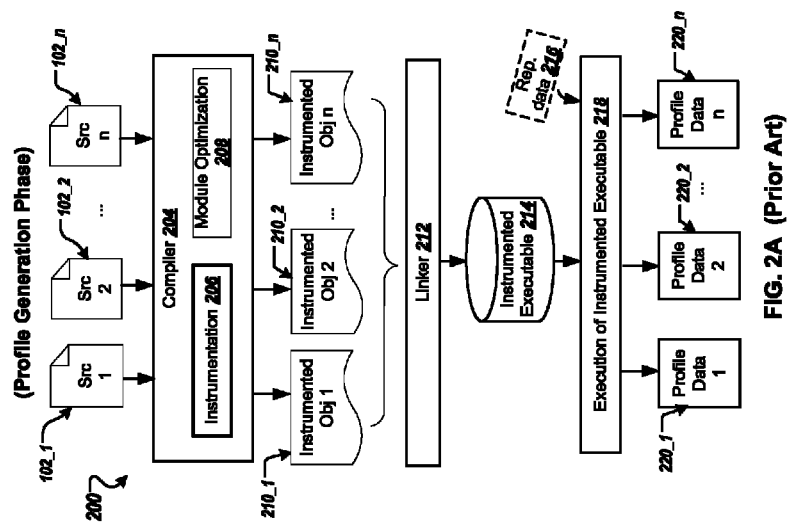
FIG. 2A is a block diagram illustrating a prior art feedback-directed optimization (FDO) system during the profile generation phase.

FIGS. 2A and 2B illustrate the processing of source code modules in a prior art FDO system 200. FIG. 2A shows the FDO system 200 in the profile generation phase. FIG. 2B shows the example FDO system 200 in the profile use phase. In the profile generation phase, profile data are collected by executing a first version of an executable program. In the profile use phase, the profile data are provided to the compiler's optimization mechanism, and the compiler recompiles the source code modules based on the profile data to create optimized object code modules and hence a second, more efficient version of the executable program.

Profile generation can be instrumentation-based. As shown in FIG. 2A, a set of source code modules (102_1, 102_2, . . . , 102_n) are supplied to the compiler 204. The compiler 204 includes a module optimization mechanism 208 which performs some initial optimization on the source code modules. However, the optimization that can be performed at this stage is very limited since there is no run-time profile data or inter-procedural analysis information available at this time. The compiler 204 includes an instrumentation system 206 which inserts instrumentation code throughout the binaries generated from the source code modules to produce a set of instrumented object code modules (210_1, 210_2, . . . , 210_n). Subsequently, the instrumented object code modules (210_1, 210_2, . . . , 210_n) and referenced libraries are linked together by a linker 212 to create an instrumented executable program module 214.

Once the instrumented executable program module 214 is created, it is executed on a set of representative input data 216 in a profile collection run 218. The instrumentation code is embedded throughout the instrumented object code modules and hence the instrumented executable program module 214 can allocate and compute various profiling counters for each procedure, function, method, data structure, and variable in each source code module during the execution of the instrumented executable program module 214.

The instrumentation code embedded in the instrumented executable program module 214 also sets up storage areas for the profile information collected during the profile collection run. Typically, the profile information for source code modules are written into individual profile data files (220_1, 220_2, . . . , 220_n), one for each source code module. The individual profile data files can also be combined into a single profile database.

The profile generation can also be sampling-based. In a sampling-based profile generation process, a sampling profiler is used. Instrumentation of the executable program module is not required for sampling-based profile collection. During the execution of the executable program module, the sampling profiler accumulates statistical profiling information on procedures, functions, methods, data structures, and variables in each source code module by probing the executable's program counter at regular intervals using operating system interrupts. The source context of the raw profile statistics are obtained through annotation of the source code modules that was created during compilation of the executable program module. Equipped with the source context information, the sampling profiler can determine the frequency at which each line of a source code file has been executed and the timing of the execution.

Once the executable program module 214 has been executed and the profile data (220_1, 220_2, . . . , 220_n) have been collected, the profile use phase of the feedback-directed IPO can begin. As shown in FIG. 2B, during the profile use phase of the feedback-directed IPO, the module optimization mechanism 208 in the compiler 204 is invoked. The module optimization mechanism 208 reads in the original set of source code modules (102_1, 102_2, . . . , 102_n) and their respective set of profile data (220_1, 220_2, . . . , 220_n) to create a set of optimized object modules (222_1, 222_2, . . . , 222_n). The optimization mechanism 208 performs various optimization transformation within each source code module based on the profile information. However, IPO across source code modules is not performed due to the lack of any inter-procedural analysis at this stage.

After the set of optimized object code modules (222_1, 222_2, . . . , 222_n) are generated, they are linked by the linker 212 to create an optimized executable program module 224. In some implementations, part of the optimization mechanism 208 resides within the linker 212 for handling procedure packaging within the optimized executable module 224.

To enable the benefit of IPO without the significant negative impact on compilation time, a feedback-directed IPO model is disclosed in this specification. In the feedback-directed IPO model, inter-procedural analysis is taken out of the link-time, and performed during the program execution in the profile generation of a conventional FDO process. By moving some important inter-procedural analysis (such as inline analysis) into the profile generation phase of a feedback-directed compilation process, both profile data for individual source code modules and the inter-procedural analysis results (such as module grouping information needed for cross-module inlining) can be obtained at the end of the profile generation phase.

Many IPO techniques can be used to reduce duplicate calculations, procedural call overhead, and inefficient memory use. Among all IPO techniques, cross module inlining (CMI) is one of the most common and useful. CMI eliminates procedure boundaries that are not possible to remove in a single module compilation. By eliminating procedure boundaries through CMI, program performance can be improved due to the reduction of call overhead, added context sensitivity, larger optimization region, and larger scheduling region. Added context sensitivity allows more constant propagation, redundancy elimination, dead code and unreachable code elimination. Some enabling transformations for CMI, such as indirect call promotion, can improve code performance in their own rights. The remaining benefits of IPO come mostly from whole program analysis such as pointer analysis, mod/ref analysis, etc.

Due to the central role of CMI in IPO, in the feedback-directed IPO model disclosed in this specification, the run-time dynamic analysis can be based on IPO heuristics primarily targeting CMI, which produces module grouping information. However, run-time dynamic analysis targeting other IPO techniques can also be implemented, such as pointer analysis, mod/ref analysis, etc. Decisions on whether a callee procedure should be inlined or promoted (e.g., in an indirect call) can be based on the sizes of the caller and callee procedures, the frequency of the call, the location of the callsite, the call context, the call depth, the computation cost of the callee procedures, and so on. The information needed for the grouping analysis can come from the summary data (including a control flow graph) produced during the compilation of the source code modules in the profile generation phase. The information needed for module grouping analysis can further include profile data (e.g., call edge frequency, and callsites for call target, etc.) that are produced during program execution in the profile generation phase.

Figure 3A:
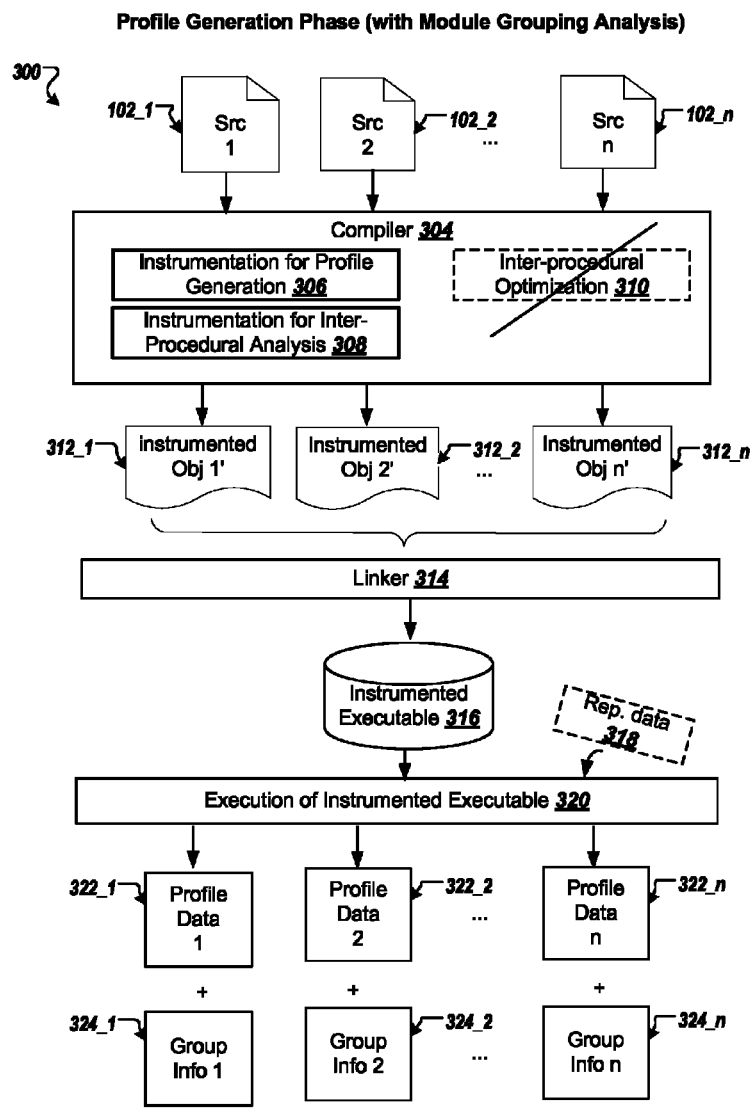
FIG. 3A is a block diagram illustrating an example feedback-directed IPO system during the profile generation phase.

FIG. 3A illustrates the profile generation phase in an example feedback-directed IPO system. During the profile generation phase, a set of source code modules (102_1, 102_2, . . . , 102_n) is provided to the compiler 304. The compiler 304 in some implementations is implemented as one or more software modules or components (e.g., applications, libraries) executing on a single computer or distributed across a plurality of computers which are able to communicate information through data networks and other means. The compiler 304 includes an instrumentation mechanism 306 for profile generation. In some implementations, the compiler 304 has an additional instrumentation mechanism 308 for providing the program instructions for module grouping analysis. In further implementations, program instructions for profile generation and module grouping analysis are inserted in the object code modules by a single instrumentation mechanism. The compiler 304 also includes an IPO transformation mechanism 310.

At the end of the instrumentation process, the compiler 304 generates a set of instrumented object files (312_1, 312_2, . . . , 312_n). The compiler 304 also generates summary data files for each source code module. The summary data files include summaries of each procedure and callsite in the source code modules, for example. The summary data file can also include a control flow graph for each source code module.

The instrumented object files (312_1, 312_2, . . . , 312_n) are received and linked by the linker 314 to generate an instrumented executable program module 316. The linker 314 in some implementations is implemented as one or more software modules or components executing on a single computer or distributed across a plurality of computers which are able to communicate information through data networks and other means. The instrumented executable program module 316 is not only capable of generating profile data during execution, but also capable of performing various inter-procedural analyses based on the profile data and the summary data.

After the instrumented executable program module 316 is created, it is executed on a set of representative data 318. The selection of representative data 318 can vary depending on the purpose of the executable program in different context. For example, sometimes, several versions of an optimized executable program module can be created using profile data generated on representative data sets with different characteristics. In some implementations, profile data is accumulated by repeating the profile generation runs multiple times on different sets of representative data.

During the program execution process 320, profile generation and inter-procedural analysis (including cross-module inlining analysis for module grouping) are carried out by the profile generation and IPO/module grouping analysis instructions embedded in the instrumented executable program module 316. Typically, profile information that are of interest include invocation pattern of each code branch, call targets of indirect calls, range and value changes on function parameters, and the number of iterations in certain constructs (such as loops). In some implementations, the instrumented executable program module 316 generates a dynamic call graph based on the profile information generated during program execution. The module grouping analysis is based on the profile information associated with the call edges and caller/callee nodes in the dynamic call graph at the end of the program execution. The grouping affinity between source code modules is determined based on one or more IPO heuristics targeting CMI. For example, a high edge frequency count for a cross-module procedural call between a caller procedure in one source code module and a callee procedure in another source code module may lead to the determination that it is beneficial to inline the callee procedure at the callsite in the caller procedure. The caller and callee procedures can be grouped and the defining source code modules for the caller and the callee procedures can also be grouped for cross module inlining purposes. The result of the module grouping analysis is stored as module grouping information (324_1, 324_2, . . . , 324_n). The module grouping information can be stored as part of the profile data files (322_1, 322_2, . . . , 322_n). In some implementations, the grouping information and the profile data are also stored in memory, if the profile use phase is going to be performed immediately after the profile generation phase.

As an alternative, a sampling profiler is used to generate profile data on the procedures and callsites in the source code modules. If a sampling profiler is to be used, the inter-procedural analysis (e.g., module grouping analysis for inlining) is implemented as part of the sampling profiler's capabilities. The inter-procedural analysis (e.g., module grouping analysis) is carried out by the sampling profiler toward the end of the profile generation run.

Figure 3B:
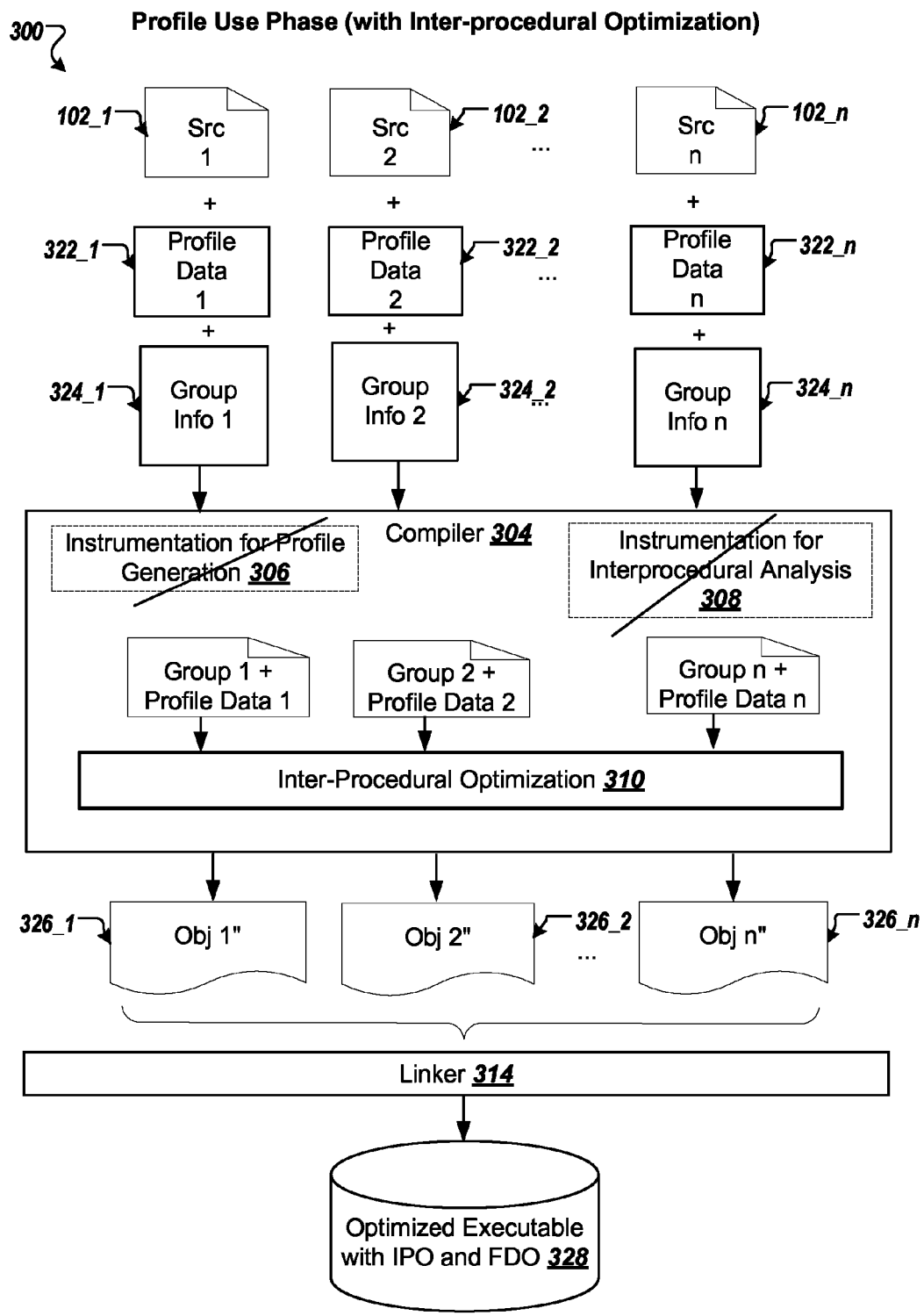
FIG. 3B is a block diagram illustrating the example feedback-directed IPO system during the profile use phase.

FIG. 3B illustrates the profile use phase in the example feedback-directed IPO system. During the profile use phase in the feedback-directed IPO system, inter-procedural analysis results (e.g., module grouping/function information) as well as profile data is used to perform inter-procedural optimization transformations. At the start of the profile use phase, the source code modules (102_1, 102_2, . . . , 102_n), profile data files (322_1, 322_2, . . . , 322_n), and the inter-procedural analysis results (e.g., module/function grouping information (324_1, 324_2, . . . , 324_n)) are received by the compiler 304. Additional information that is made available to the compiler includes summary data files for the source code modules. The summary data includes control flow edge count and value profile for operands of important operations.

During the profile use phase, the inter-procedural transformation and optimization mechanism 310 is invoked. The inter-procedural transformation and optimization mechanism 310 performs CMI based on the module/function grouping information. The CMI typically reduces the cost of the procedure call, and allows the code for the inlined procedure to be better optimized since the calling context is made explicit. Another important IPO transformation is indirect call promotion which can be performed prior to cross-module inlining. An indirect call is a call where the address of the call target has to be loaded from memory. Indirect calls make it difficult for the compiler to understand the control flow of the program since the contents of the function pointer can be ascertained only at run time. By using the profile data and inter-procedural analysis results generated at run-time, indirect calls are promoted and become explicit calls, and then CMI of the callee function can be performed if appropriate. The inter-procedural transformation and optimization mechanism 310 can also perform other optimizations such as restructuring the layout of data and instructions in the source code modules, promotion of constants, and so on based on other IPO heuristics and analysis decisions.

At the end of the inter-procedural transformation and optimization process, a set of optimized object code modules (326_1, 326_2, . . . , 326_n) are generated. These optimized object code modules as well as libraries of referenced standard routines are linked by the linker 314 to produce an optimized executable program module 328.

Figure 3C:
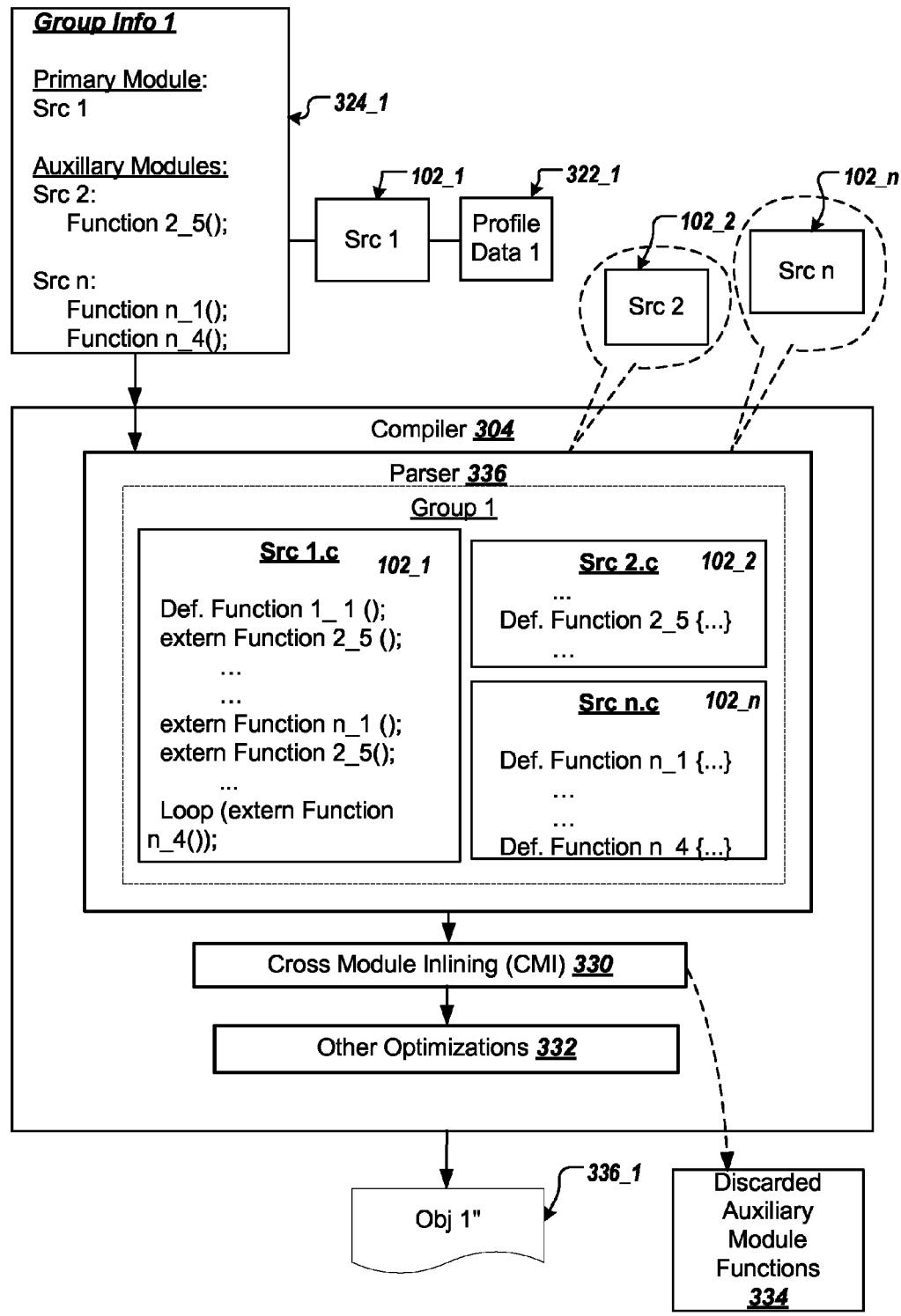
FIG. 3C is a block diagram illustrating the compilation process in the feedback-directed IPO system during the profile use phase.

FIG. 3C illustrates in more detail how the module/function grouping information is utilized by the compiler 304 to produce an optimized object code module. During module/function grouping in the profile generation phase, each original source code module is designated as the primary module for an associated module group. Each module group may also include one or more auxiliary modules of the primary module. In many instances, however, a module group may include just the primary module, and no auxiliary modules.

As shown in FIG. 3C, module group information 324_1 associated with source code module 102_1 identifies source code module 1 as the primary module for module group 1. The module group information 324_1 also identifies all auxiliary modules of the primary module, namely, source code modules 102_2 and 102_n. The module group information 324_1 further identify the callee functions or procedures in the auxiliary modules that are to be "imported" into the primary module for cross-module inlining, namely, Function 2_5 in source code module 102_2, Function n_1 and Function n_4 in source code module 102_n.

As shown in FIG. 3C, each source code module can be processed by the compiler 304 separately and in parallel, which improves compile time and scalability. For example, for the first module group, source code module 102_1 is read in by the compiler 304 with its associated module group information 324_1 and profile data 322_1. The module group information 324_1 for source code module 102_1 identifies that source code modules 102_2 and 102_n are auxiliary modules of source code module 102_1, therefore, source code modules 102_2 and 102_n are also retrieved and read in by the compiler 304. The compiler's front end 336 parses the primary module as well as all the auxiliary modules that have been read in. The compiler backend driver 330 also identifies the callsites and the callee functions that are to be inlined at the callsites, and perform the cross-module inlining in the primary module. In some implementations, selective parsing of the auxiliary modules is implemented such that only the "imported" functions rather than the entirety of the auxiliary modules are parsed. For functions selected for cross module inlining, all non-global static references in that function are promoted to global scope to allow cross module linking. The compiler backend 332 also performs various other optimization transformations such as those done in conventional FDO. After the compiler backend drivers 330 and 332 finish the transformation and optimization, an optimized object code module 326_1 for the source code module 102_1 is generated. Most of the functions (334) from the auxiliary modules are discarded after the inter-procedural inlining.

With this feedback-directed IPO design, there is no need for serialization of the compilation for different modules or for persistence of the IRs at link-time. Therefore, the I/O overhead for writing and reading IRs is eliminated. Cross module optimization is done at a single, yet extended module level by importing auxiliary modules on a need basis, thus allowing maximum build time parallelism.

Figure 4:
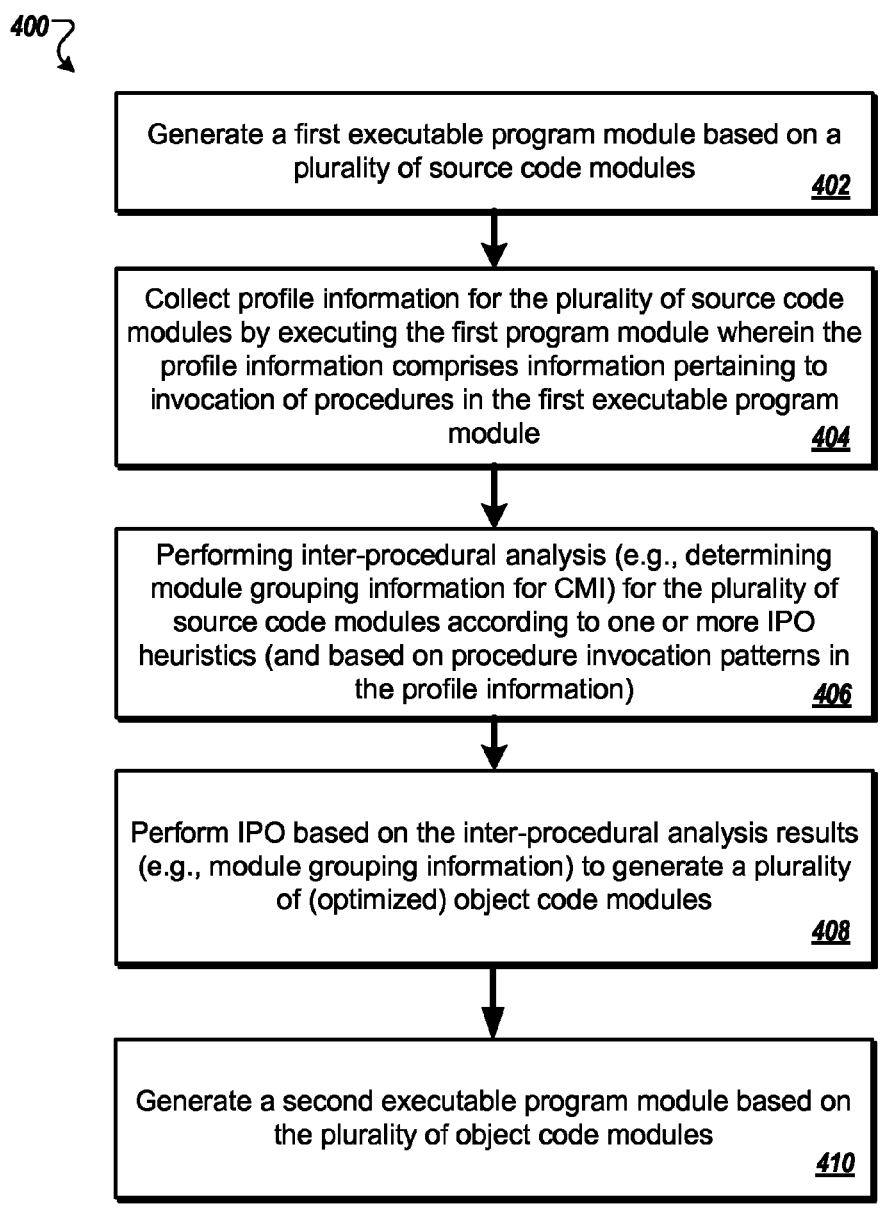
FIG. 4 is a flow diagram of an example feedback-directed IPO process.

FIG. 4 shows the basic stages of an example feedback-directed IPO process 400. In various implementations, the process begins when a first executable program module is generated based on a plurality of source code modules (402). Then, profile information for the plurality of source code modules is collected by executing the first program module and wherein the profile information comprises information pertaining to invocation of procedures in the first executable program module (404).

In some implementations, the first executable program module is an instrumented executable program module. The instrumentation code embedded throughout the instrumented executable program module generates profile data for the plurality of source code modules when the executable program module is executed. The profile information for the plurality of source code modules include edge profile counters for procedures, value profile counters for call targets at various callsites in a procedure. Other value profile counters include occurrence counters for code patterns. During the execution of the instrumented executable program module, the edge profile counters are updated to record the number of times each particular procedure is executed during run time and the callsites for each call target.

The instrumented executable program module also includes instructions for inter-procedural analysis based on summary data generated during compilation and the profile information generated during execution. The inter-procedural analysis can include data flow analysis, inline analysis, etc. on a whole program level. For inline analysis, module grouping information can be generated. Typically, toward the end of profile information collection run, module grouping information for the plurality of source code modules is determined based on procedure invocation patterns in the profile information and according to one or more IPO heuristics (406). The one or more IPO include heuristics for cross-module inlining and/or indirect call promotion. Heuristics targeting other inter-procedural optimization techniques can also be used. Profile information that is particularly relevant to cross-module inlining include, for example, the information stored in edge frequency counters and indirect call target value profile counters that are associated with procedures and callsites in each source code modules.

Alternative to using an instrumented executable program module for profile generation, a sampling profiler can be used. The sampling profiler monitors the execution of a normal (i.e., un-instrumented) executable program module compiled from the original source code modules. In a sampling-based profile generation process, the sampling profiler probes various memory locations and program counters periodically through system interrupts to gather the profile information for various procedures and callsites. In order to map the profile information to the correct procedures and callsites, the sampling profiler typically relies on annotation files or notes files generated during compilation of the un-instrumented executable program module. The sampling profiler can be implemented such that it also performs the inter-procedural analysis using the profile information collected during execution. The results of the inter-procedural analysis (e.g., module/function grouping information) are written into the profile data files at the end of the program execution.

The generation of the first executable program module (402), the collection of profile information (404), and the determination of module grouping information during execution of the first program module (406) are all be performed during a first phase, namely, the profile generation phase of the feedback-directed IPO process. After the completion of the first phase, inter-procedural optimization on the plurality of source code modules is performed based on the inter-procedural analysis results (e.g., module grouping information) that were produced during the first phase. For feedback-directed IPO targeting CMI, inter-procedural analysis (specifically, cross-module inlining) is performed based on the module grouping information and a plurality of optimized object code modules are generated (408). The IPO transformation is performed in a second phase, namely, the profile use phase of the feedback-directed IPO process.

In the second phase of the feedback-directed IPO process, the plurality of original source code modules are compiled again with the guidance of the information gathered during the first phase. When compiling the source code modules during the second phase, the compiler performs inter-procedural transformation and optimization on the plurality of source code modules based on the inter-procedural analysis results (e.g., module grouping information for CMI) and/or the profile information to generate a plurality of (optimized) object code module (408).

The inter-procedural transformation and optimization for each individual source code module can be performed separately and in parallel with the transformation and optimization of other source code modules. When all the transformation and optimization are completed, the compiler generates a set of optimized object code modules. The set of optimized object modules and any libraries containing referenced standard routines are linked together to create a second (optimized) executable module (410).

Figure 5:
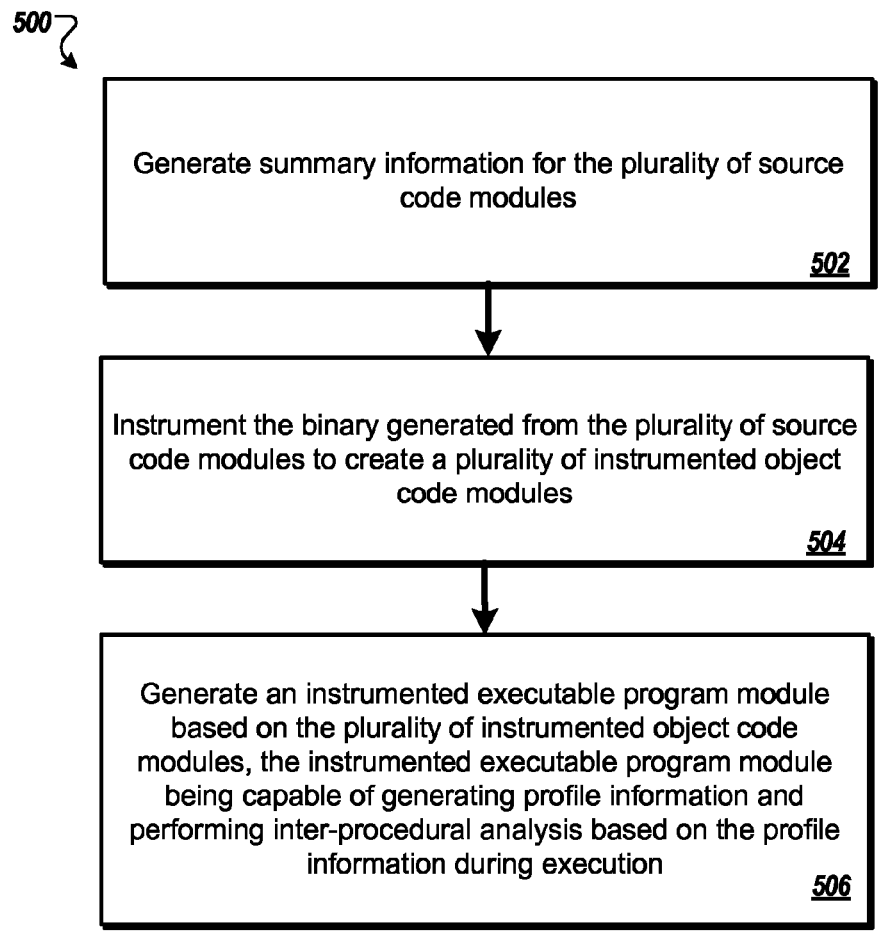
FIG. 5 is a flow diagram of an example instrumentation process.

FIG. 5 illustrates an example process 500 for compiling an instrumented executable program module in the profile generation phase of an example feedback-directed IPO process. The process 500 begins when a plurality of source code modules are received by the compiler. The compiler frontend parses each of the plurality of source code modules and generates summary information for each of the plurality of source code modules (502). The summary data include callsite information (e.g., call location, caller, callee, etc.), mod/ref counts of variables, array section and shape, and so on. The summary information can be specified with respect to a control flow graph for each of the plurality of source code modules. The control flow graph contains basic blocks and edges, where the edges are ordered such that they can be easily mapped to the profile counter indices. In some implementations, summary information that are needed for mapping raw profile counters to procedures and/or callsites in the source code modules are stored separately in notes files to provide context for the profile counters during the profile use phase. In some implementations, the summary information and the inter-procedural analysis results are stored in non-loadable sections of the "fat object files" so that they can be passed to the profile use phase in a way that is transparent to the user. Some core data (such as profile counters) can even be allocated statically in memory.

After parsing, the compiler instruments the binary generated from the plurality of source code modules to create instrumented object code modules (504). The instrumented object code modules are linked to generate an instrumented executable program module (506). The instrumented executable program module generates profile counter information for procedures and callsites in the plurality of source code modules when it is run on a representative data set (if input data is needed). The instrumented executable program module also performs inter-procedural analysis (e.g., module/function grouping for CMI) based on the profile information produced during program execution and/or summary information produced during source compilation. In some implementations, the instrumented executable program module generates dynamic call graphs for the plurality of source code modules based on the summary data and the profile data during execution. The instrumented executable program module can write the results of the inter-procedural analysis as separate files or as part of the profile information files during execution.

Figure 6:
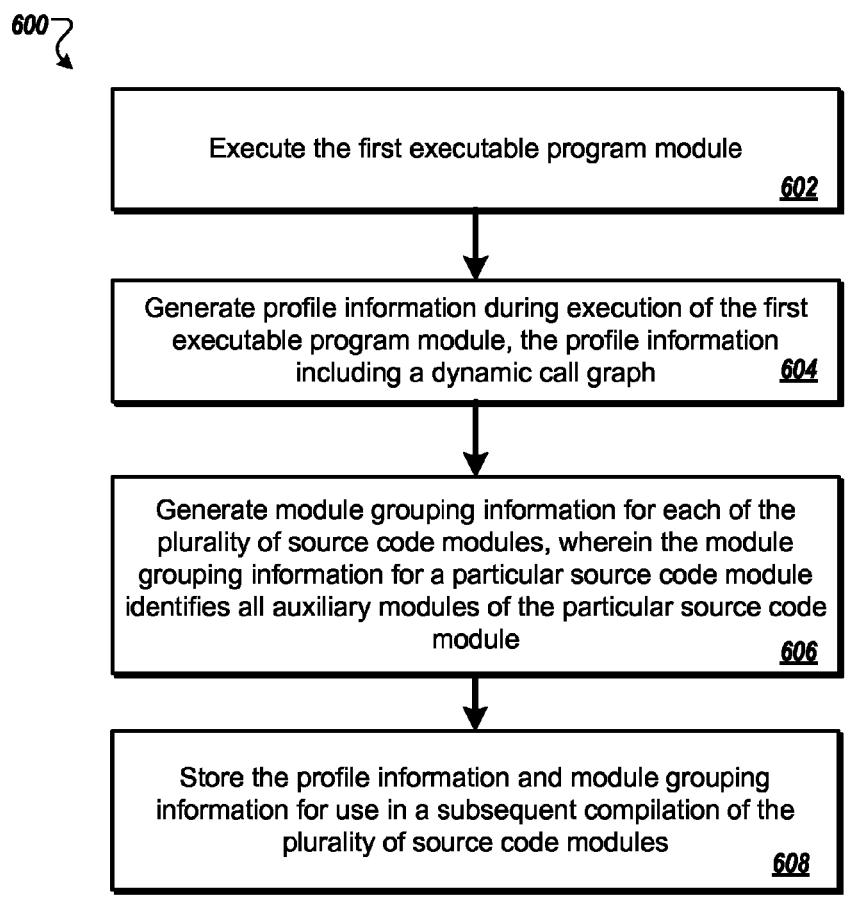
FIG. 6 is a flow diagram of an example profile collection/collection process.

FIG. 6 illustrates an example profile generation/collection process 600 in a feedback-directed IPO process. The profile generation/collection process 600 begins when an executable program module is executed (602). The executable program module can be an instrumented executable program module produced by the example process shown in FIG. 5. Alternatively, if the profile generation is to be carried out by a sampling profiler, the executable program module can be a regular executable program module without instrumentation. To facilitate the profile generation by the sampling profiler, various summary and annotation data is generated during compilation of the executable program module to facilitate the mapping between raw sampling data and its context in the source code modules. The execution of the first executable program can be done on one or more sets of representative data.

During the execution of the first executable program module, profile information is generated (604). The profile information includes a dynamic call graph. The profile generation can be accomplished by the instrumentation code embedded in an instrumented executable program module or by a sampling profiler that monitors the execution of a regular executable program module.

For example, when using an instrumented executable for profile generation, profile data can be collected using profile counters pre-allocated (statically) as global arrays for each translation unit or its corresponding source code module.

For each translation unit, the profile counters are grouped according to their counter types. For each counter type, a counter index is assigned to each function or procedure in the same translation unit. For edge profiling counter type, there is one counter (and one index) per selected edge in the minimum spanning tree of the control flow graph. For value profiling counter types, there are usually more than one counter values (and more than one indices) associated with one tracking site (e.g., callsite for call target), and the rest of the value counters are for the occurrence counts.

For the feedback directed IPO model targeting CMI, two profile counters are the edge frequency profiling counter and the indirect call target value profiling counter. New profile counters can be defined to collect per_site call counts or inferred using edge profiling information. For indirect calls, the value profiling counters are employed. The downside of defining and using new counter types is the additional slow down of the profile collection run, while the upside is that less annotation data would be needed for interpreting the profile data.

The profile information includes a dynamic call graph. The dynamic call graph can be build by the instrumentation code or the sampling profiler using the summary information produced during the earlier compilation of the executable program module and the edge profile counters and value profile counters generated during the execution of the executable program module. The profile information on how many times each static call site is dynamically called is utilized to build a dynamic call graph during the profile generation/collection run. A callsite's basic block information is maintained to compute the profile information for each callsite.

When building the dynamic call graph, indirect function calls are handled by making use of the value profiling information for the indirect callsites. The information needed for representing an indirect callsite on the dynamic call graph includes the indirect call's associated value profiling counter index. Such indirect callsite information can be store as part of the annotation files in the same way as for the direct callsites.

After the profile information (including the dynamic call graph) has been generated, the compiler generates module grouping information for each of the plurality of source code modules (606). The grouping is done according to one or more inter-procedural optimization heuristics. Module grouping information is the result of the inter-procedural analysis performed based on the profile information. Profile counters as well as the control flow graph produced by the compiler frontend are used to generate module grouping information. For example, for inlining, if a certain call edge in the dynamic call graph has a high edge frequency count, it may be beneficial to inline the callee procedure to reduce call overhead. The module grouping information for each particular source code module (i.e., the primary module of the group) identifies all other modules (auxiliary modules) in the plurality of source code modules that should be available (e.g., for inline purposes) in the compiler for inter-procedural optimization of the primary module. During the profile use phase, the compiler first reads in a primary source code module and its associated module grouping information, and then automatically retrieve the source code of the auxiliary modules to perform IPO (e.g., CMI) on the primary source code module.

Figure 7:
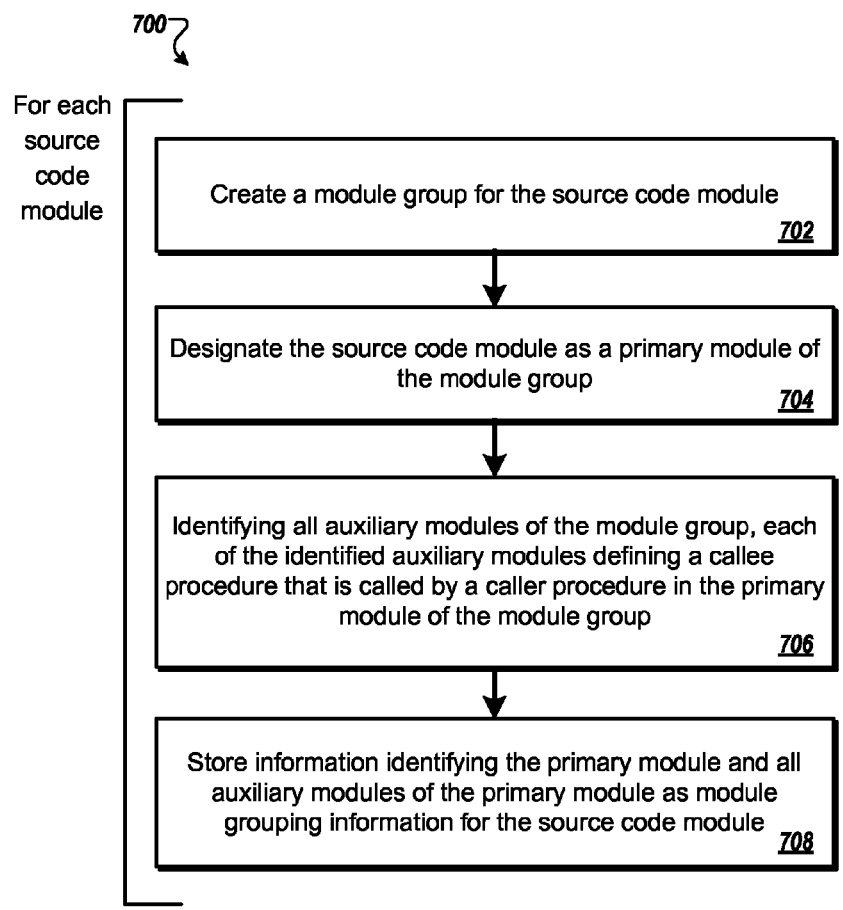
FIG. 7 is a flow diagram of an example module grouping process.

FIG. 7 illustrates an example process 700 for generating and storing module grouping information for each module group. First, for each source code module that is to be compiled, a module group is created (702). Then, for each source code module, the source code module is designated as the primary module for its own module group (704). Then all auxiliary modules of each source code module are identified (706). For cross-module inlining purposes, an auxiliary module of a primary module defines a callee procedure that is called by a caller procedure in the primary module, and a call edge from the caller procedure to the callee procedure has an edge frequency count exceeding a threshold value. For each source code module, the information identifying the primary module and all of its auxiliary modules is stored as module grouping information for the source code module (708).

In some implementations, for each primary module, the primary module's grouping information is stored in the form of an array containing auxiliary module data. Each auxiliary module data contains information such as the source module location and, optionally, a list of functions that are actually "imported" by the primary module. In some implementations, the auxiliary module data does not include the list of functions that are exported to the primary module, and all functions in the auxiliary module can be "imported" by the primary module. There can also be optional grouping data for each source code module that contains a list of functions defined in the source code module that are "exported" to the other source code modules. This optional grouping data can be implemented as a "flag bit" in the primary module. For example, if the "flag bit" is marked as true, then all functions in the primary module are marked as "exported." The module grouping information can be used for static promotion of variables.

Module grouping can be based on function grouping across source code modules as shown on the dynamic call graph that captures function, procedure or method invocation patterns. For example, if a call edge between a caller node in one source code module and a callee node in a different source code module is "hot," i.e., if the edge frequency count is above a threshold value, then the defining module of the callee procedure is grouped with the defining module of the caller procedure. The callee's defining module becomes an auxiliary module of the caller's defining module. Each source code module can be a primary module of its own group, but can also be the auxiliary module for multiple other source code modules. Module grouping analysis looks at each caller procedure in a particular source code module to determine if a cross-module callee in another source code module should be grouped with that particular source code module. The list of all auxiliary modules of each source code modules is produced and stored as part of the profile data file.

Figure 8:
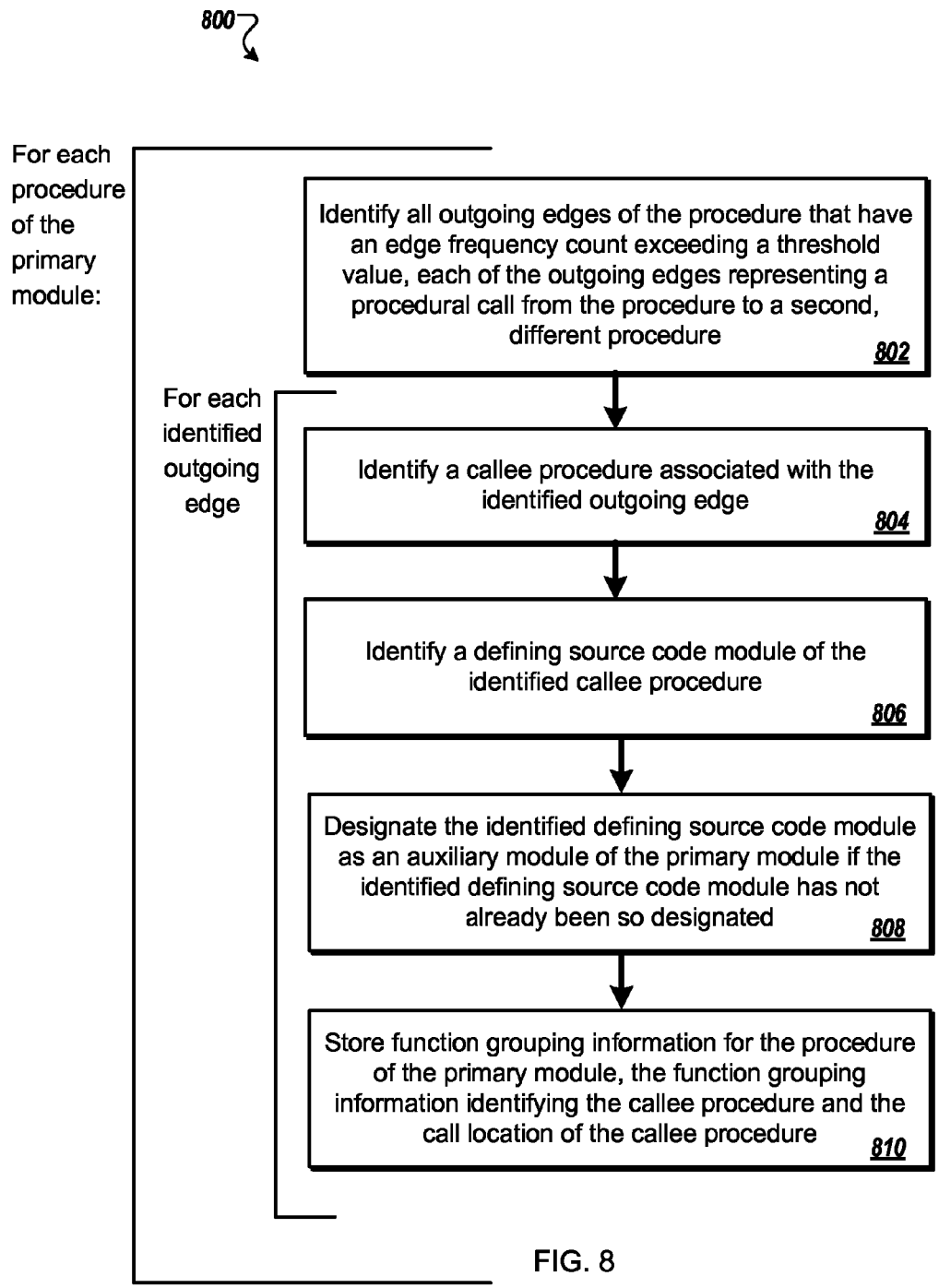
FIG. 8 is a flow diagram of an example module grouping process based on function grouping.

FIG. 8 illustrates an example process 800 for function grouping for CMI purpose. Each procedure in a source code module is represented by a node on the dynamic call graph. A procedure call from a caller node to a callee node is represented by an edge joining the caller node to the callee node. For each node in the dynamic call graph, all outgoing edges of the procedure that have edge frequency counts exceeding a pre-determined threshold value are identified (802). An outgoing edge represents a procedural call from the procedure represented by the current node to a second, different procedure. Then for each identified outgoing edge of each procedure in each primary module, the follow steps (804, 806, 808, and 810) are performed. First, a callee procedure associated with the identified outgoing edge is identified (804). Then the source code module that defines the callee procedure (i.e., the defining source code module of the callee procedure) is identified (806). Then, the identified defining module of the callee procedure is designated as an auxiliary module of the defining module of the caller procedure (i.e., the current primary module) unless it has already been so designated (808). The function grouping information for the procedure of the primary module is stored (810). The function grouping information identifying the procedure of the primary module and the function grouping information is obtained for all procedures in a primary module.

In some implementations, a greedy algorithm is used to perform the function and module grouping. For each node in the dynamic call graph, the callee procedures associated with the outgoing edges of the node is identified. If the edge frequency count for an outgoing edge exceeds a pre-determined threshold value, the callee procedure associated with that edge is placed in the same function group as the caller (the procedure represented by the current node). Note that the same callee function is allowed to be in multiple different caller's function group. When the function grouping for all nodes are completed, the defining modules of all callee functions for each function group is identified, if the identified defining modules are different from the defining module of the caller function, the callees' defining modules are added to the module group of the caller's defining module unless it is already in the module group.

Figure 9:
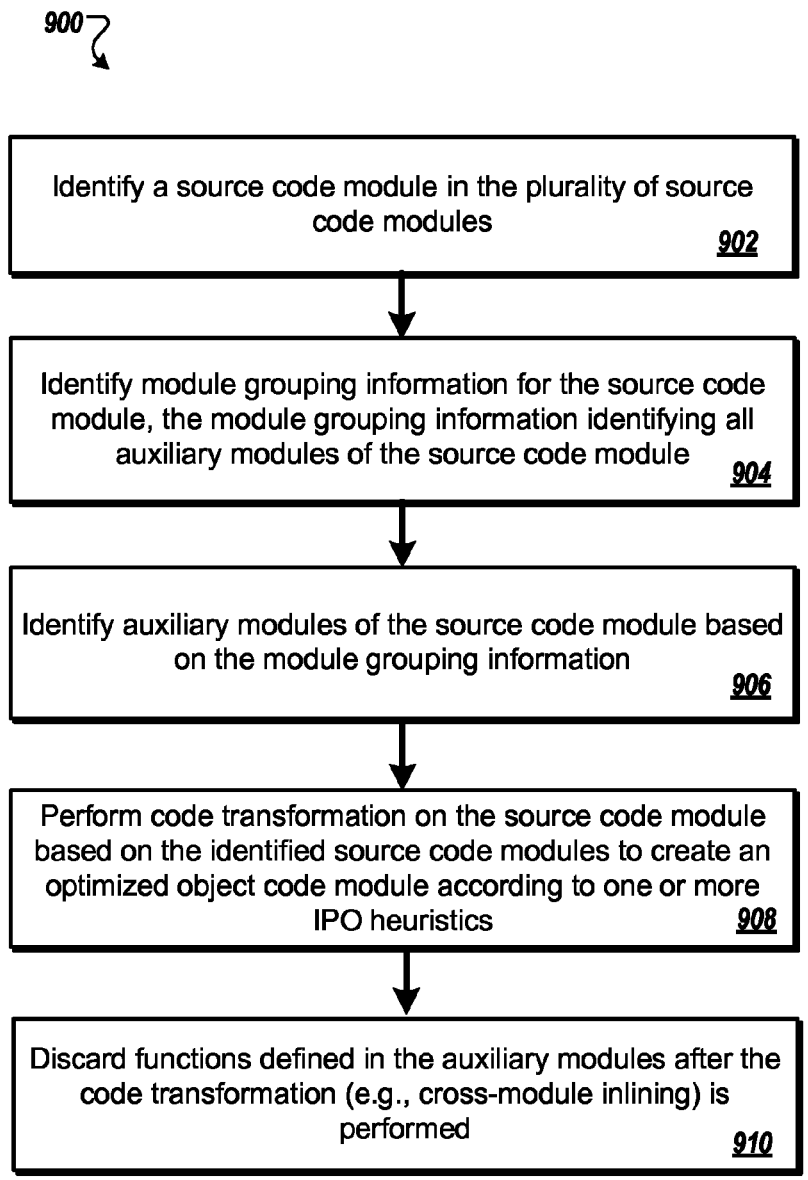
FIG. 9 is a flow diagram of an example process for performing IPO during the profile use phase of the feedback-directed IPO process.

FIG. 9 illustrates the example process 900 for performing IPO based on the profile information and the module/function grouping information. First, a source code module in the plurality of source code modules is identified for compilation (902). Then, module grouping information for the source code module is identified (904). Then, auxiliary modules of the source code module are identified based on the module grouping information (906). Code transformation is performed on the source code module based on the identified source code modules (e.g., "imported" functions) to create an optimized object code module according to one or more IPO heuristics (e.g., CMI) (908). Performing code transformation includes inlining procedures (i.e., imported functions) from the identified auxiliary source code modules into the primary source code module. Then, functions in the auxiliary modules are discarded after the code transformation (e.g., CMI) is performed (910).

In some implementations, prior to the inter-procedural transformation and optimization, scalar optimization is also performed during this phase. Scalar optimization includes constant propagation (i.e., replace constant valued variables with constants), common sub-expression elimination (i.e., avoid recomputing value if value has been computed earlier in program), loop invariant removal (i.e., move computations into less frequently executed portions of program, strength reduction (i.e., replace expensive operations like multiplication with simpler operations like addition), and dead code removal (i.e., eliminate unreachable code and code that is irrelevant to output of program), etc.

Figure 10:
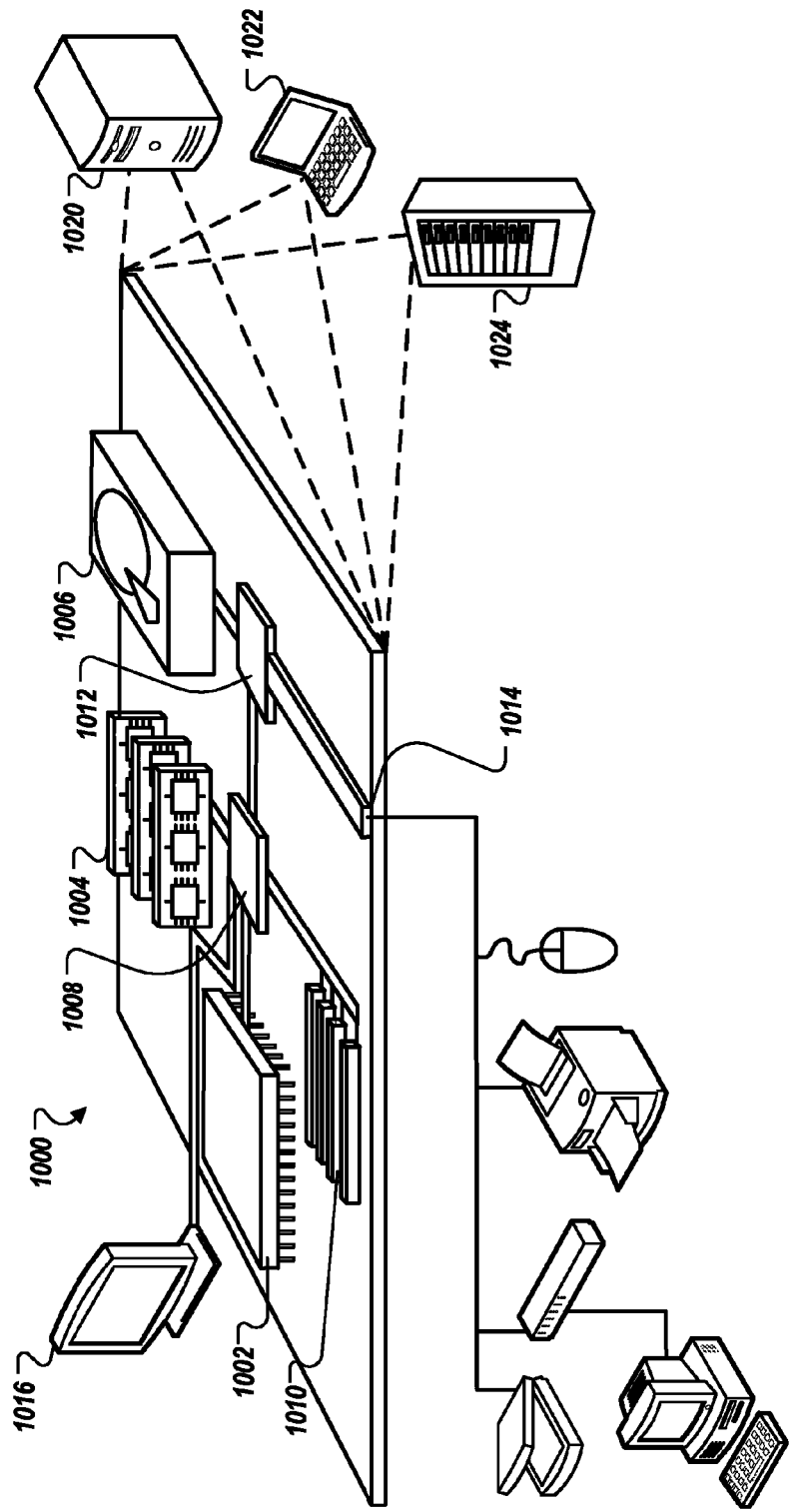
FIG. 10 is a block diagram of a generic computer.

FIG. 10 is a block diagram of example computing devices 1100 that may be used to implement the systems and methods described in this document. Computing device 1000 is intended to represent various forms of digital computers, such as laptops, desktops, workstations, personal digital assistants, servers, blade servers, mainframes, and other appropriate computers. The components shown here, their connections and relationships, and their functions, are meant to be exemplary only, and are not meant to limit implementations of the inventions described and/or claimed in this document.

Computing device 1000 includes a processor 1002, memory 1004, a storage device 1006, a high-speed interface 1008 connecting to memory 1004 and high-speed expansion ports 1010, and a low speed interface 1012 connecting to low speed bus 1014 and storage device 1006. Each of the components 1002, 1004, 1006, 1008, 1010, and 1012, are interconnected using various busses, and may be mounted on a common motherboard or in other manners as appropriate. The processor 1002 can process instructions for execution within the computing device 1000, including instructions stored in the memory 1004 or on the storage device 1006 to display graphical information for a GUI on an external input/output device, such as display 1016 coupled to high speed interface 1008. In other implementations, multiple processors and/or multiple buses may be used, as appropriate, along with multiple memories and types of memory. Also, multiple computing devices 1000 may be connected, with each device providing portions of the necessary operations (e.g., as a server bank, a group of blade servers, or a multi-processor system).

The memory 1004 stores information within the computing device 1000. In one implementation, the memory 1004 is a computer-readable medium. In one implementation, the memory 1004 is a volatile memory unit or units. In another implementation, the memory 1004 is a non-volatile memory unit or units.

The storage device 1006 is capable of providing mass storage for the computing device 1000. In one implementation, the storage device 1006 is a computer-readable medium. In various different implementations, the storage device 1006 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 1004, the storage device 1006, or memory on processor 1002.

The high speed controller 1008 manages bandwidth-intensive operations for the computing device 1000, while the low speed controller 1012 manages lower bandwidth-intensive operations. Such allocation of duties is exemplary only. In one implementation, the high-speed controller 1008 is coupled to memory 1004, display 1016 (e.g., through a graphics processor or accelerator), and to high-speed expansion ports 1010, which may accept various expansion cards (not shown). In the implementation, low-speed controller 1012 is coupled to storage device 1006 and low-speed expansion port 1014. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 1000 may be implemented in a number of different forms, as shown in the figure. For example, it may be implemented as a standard server 1020, or multiple times in a group of such servers. It may also be implemented as part of a rack server system 1024. In addition, it may be implemented in a personal computer such as a laptop computer 1022. Alternatively, components from computing device 1000 may be combined with other components in a mobile device (not shown), such as device 1050. Each of such devices may contain one or more of computing device 1000, 1050, and an entire system may be made up of multiple computing devices 1000, 1050 communicating with each other.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments of the invention have been described. Nevertheless, it will be understood that various modifications may be made without departing from the spirit and scope of the invention. For example, various forms of the flows shown above may be used, with steps re-ordered, added, or removed. Also, although several applications of the search systems and methods have been described, it should be recognized that numerous other applications are contemplated. While reference is made to determining hierarchical data associated with a resource determined as a search result, hierarchical data can be associated with a resource identified by other means. For example, hierarchical data can be determined for a resource and associated with that resource, where a visual representation of the hierarchical data can be attached to the resource for display to a user in an email message. The resource may be the result of a request made by a user to customer service support on a web site for specific information included on the web site. Accordingly, other embodiments are within the scope of the following claims.

What is claimed is:

1. A method for feedback directed inter-procedural optimization, comprising:
- generating a first executable program module based on a plurality of source code modules;
- collecting profile information based on feedback directed analysis for the plurality of source code modules by executing the first executable program module and wherein the profile information comprises information pertaining to invocation of procedures in the first executable program module;
- determining module grouping information for the plurality of source code modules based on procedure invocation patterns in the profile information and according to one or more inter-procedural optimization heuristics, wherein determining the module grouping information comprises:
  - for each source code module:
    - creating a module group for the source code module;
    - designating the source code module as a primary module of the module group; and
    - identifying all auxiliary modules of the module group, each of the identified auxiliary modules defining a callee procedure that is called by a caller procedure in the primary module of the module group, wherein identifying all auxiliary modules includes,
      - for each procedure in the primary module:
        - identifying all outgoing edges of the procedure that have an edge frequency count exceeding a threshold value, each of the outgoing edges representing a procedural call from the procedure to a second, different procedure; and
        - for each of the identified outgoing edges:
          - identifying a callee procedure associated with the identified outgoing edge;
          - identifying a defining source code module of the identified callee procedure; and
          - designating the identified defining source code module as an auxiliary module of the primary module if the identified defining source code module has not already been so designated;
- performing inter-procedural optimization based on the module grouping information to generate a plurality of object code modules; and
- generating a second executable program module based on the plurality of object code modules.

2. The method of claim 1, wherein information pertaining to invocation of procedures includes one or more of an edge frequency count and an indirect call target count.

3. The method of claim 1, wherein collecting profile information further comprises gathering profile information using a sampling profiler during execution of the first executable program module.

4. The method of claim 1, wherein collecting profile information further comprises:
- creating a dynamic call graph during execution of the first executable program module, the dynamic call graph including nodes and edges, each node representing a procedure defined by one of the plurality of source code modules, each edge connecting a caller node and a callee node, and representing a procedural call from a caller procedure of a first source code module to a callee procedure of a second source code module.

5. A method for feedback directed inter-procedural optimization, comprising:
- generating a first executable program module based on a plurality of source code modules;
- collecting profile information based on feedback directed analysis for the plurality of source code modules by executing the first executable program module and wherein the profile information comprises information pertaining to invocation of procedures in the first executable program module;
- determining module grouping information for the plurality of source code modules based on procedure invocation patterns in the profile information and according to one or more inter-procedural optimization heuristics, wherein determining the module grouping information comprises:
  - for each source code module:
    - creating a module group for the source code module;
    - designating the source code module as a primary module of the module group; and
    - identifying all auxiliary modules of the module group, each of the identified auxiliary modules defining a callee procedure that is called by a caller procedure in the primary module of the module group, wherein identifying all auxiliary modules includes,
      - for each procedure in the primary module:
        - identifying all outgoing edges of the procedure that have an edge frequency count exceeding a threshold value, each of the outgoing edges representing a procedural call from the procedure to a second, different procedure; and
        - for each of the identified outgoing edges:
          - identifying a callee procedure associated with the identified outgoing edge;
          - identifying a defining source code module of the identified callee procedure; and
          - designating the identified defining source code module as an auxiliary module of the primary module if the identified defining source code module has not already been so designated;
- performing inter-procedural optimization based on the module grouping information to generate a plurality of object code modules, including
  - performing code transformation on at least one of the identified source code modules based on the identified auxiliary source code modules to create an optimized object code module according to the one or more inter-procedural optimization heuristics, and inlining procedures from the identified auxiliary source code modules into the identified source code module in the plurality of source code modules; and
- generating a second executable program module based on the plurality of object code modules.

6. A non-transitory computer-readable medium having instructions stored thereon, which, when executed by at least one processor, cause the processor to perform operations comprising:

generating a first executable program module based on a plurality of source code modules;
collecting profile information based on feedback directed analysis for the plurality of source code modules by executing the first executable program module and wherein the profile information comprises information pertaining to invocation of procedures in the first executable program module;
determining module grouping information for the plurality of source code modules based on procedure invocation patterns in the profile information and according to one or more inter-procedural optimization heuristics, wherein determining the module grouping information comprises:
for each source code module:
creating a module group for the source code module;
designating the source code module as a primary module of the module group; and
identifying all auxiliary modules of the module group, each of the identified auxiliary modules defining a callee procedure that is called by a caller procedure in the primary module of the module group, wherein identifying all auxiliary modules includes,
for each procedure in the primary module:
identifying all outgoing edges of the procedure that have an edge frequency count exceeding a threshold value, each of the outgoing edges representing a procedural call from the procedure to a second different procedure; and
for each of the identified outgoing edges:
identifying a callee procedure associated with the identified outgoing edge;
identifying a defining source code module of the identified callee procedure; and
designating the identified defining source code module as an auxiliary module of the primary module if the identified defining source code module has not already been so designated;
performing IPO based on the module grouping information to generate a plurality of object code modules; and
generating a second executable program module based on the plurality of object code modules.

7. The non-transitory computer-readable medium of claim 6, wherein information pertaining to invocation of procedures includes one or more of an edge frequency count and an indirect call target count.

8. The non-transitory computer-readable medium of claim 6, wherein collecting profile information further comprises gathering profile information using a sampling profiler during execution of the first executable program module.

9. The non-transitory computer-readable medium of claim 6, wherein collecting profile information further comprises:
creating a dynamic call graph during execution of the first executable program module, the dynamic call graph including nodes and edges, each node representing a procedure defined by one of the plurality of source code modules, each edge connecting a caller node and a callee node, and representing a procedural call from a caller procedure of a first source code module to a callee procedure of a second source code module.

10. A non-transitory computer-readable medium having instructions stored thereon, which, when executed by at least one processor, cause the processor to perform operations comprising:
generating a first executable program module based on a plurality of source code modules;
collecting profile information based on feedback directed analysis for the plurality of source code modules by executing the first executable program module and wherein the profile information comprises information pertaining to invocation of procedures in the first executable program module;
determining module grouping information for the plurality of source code modules based on procedure invocation patterns in the profile information and according to one or more inter-procedural optimization heuristics, wherein determining the module grouping information comprises:
for each source code module:
creating a module group for the source code module;
designating the source code module as a primary module of the module group; and
identifying all auxiliary modules of the module group, each of the identified auxiliary modules defining a callee procedure that is called by a caller procedure in the primary module of the module group, wherein identifying all auxiliary modules includes,
for each procedure in the primary module:
identifying all outgoing edges of the procedure that have an edge frequency count exceeding a threshold value, each of the outgoing edges representing a procedural call from the procedure to a second, different procedure; and
for each of the identified outgoing edges:
identifying a callee procedure associated with the identified outgoing edge;
identifying a defining source code module of the identified callee procedure; and
designating the identified defining source code module as an auxiliary module of the primary module if the identified defining source code module has not already been so designated;
performing inter-procedural optimization based on the module grouping information to generate a plurality of object code modules, including
performing code transformation on at least one of the identified source code modules based on the identified auxiliary source code modules to create an optimized object code module according to the one or more inter-procedural optimization heuristics, and inlining procedures from the identified auxiliary source code modules into the identified source code module in the plurality of source code modules; and
generating a second executable program module based on the plurality of object code modules.

11. A system comprising:
one or more computers;
memory coupled to the one or more processors and storing instructions which, when executed by the one or more processors, cause the one or more computers to perform operations comprising:
generating a first executable program module based on a plurality of source code modules;
collecting profile information based on feedback directed analysis for the plurality of source code modules by executing the first executable program module and wherein the profile information comprises information pertaining to invocation of procedures in the first executable program module;
determining module grouping information for the plurality of source code modules based on procedure invocation patterns in the profile information and according to one or more inter-procedural optimization heuristics, wherein determining the module grouping information comprises:

for each source code module:
- creating a module group for the source code module;
- designating the source code module as a primary module of the module group; and
- identifying all auxiliary modules of the module group, each of the identified auxiliary modules defining a callee procedure that is called by a caller procedure in the primary module of the module group, wherein identifying all auxiliary modules includes,
  - for each procedure in the primary module:
    - identifying all outgoing edges of the procedure that have an edge frequency count exceeding a threshold value, each of the outgoing edges representing a procedural call from the procedure to a second different procedure; and
    - for each of the identified outgoing edges:
      - identifying a callee procedure associated with the identified outgoing edge;
      - identifying a defining source code module of the identified callee procedure; and
      - designating the identified defining source code module as an auxiliary module of the primary module if the identified defining source code module has not already been so designated;
- performing inter-procedural optimization based on the module grouping information to generate a plurality of object code modules; and
- generating a second executable program module based on the plurality of object code modules.

12. The system of claim 11, wherein information pertaining to invocation of procedures includes one or more of an edge frequency count and an indirect call target count.

13. The system of claim 11, wherein collecting profile information further comprises gathering profile information using a sampling profiler during execution of the first executable program module.

14. The system of claim 11, wherein collecting profile information further comprises:
creating a dynamic call graph during execution of the first executable program module, the dynamic call graph including nodes and edges, each node representing a procedure defined by one of the plurality of source code modules, each edge connecting a caller node and a callee node, and representing a procedural call from a caller procedure of a first source code module to a callee procedure of a second source code module.

15. A system comprising:
one or more computers;
memory coupled to the one or more processors and storing instructions which, when executed by the one or more processors, cause the one or more computers to perform operations comprising:

generating a first executable program module based on a plurality of source code modules;
collecting profile information based on feedback directed analysis for the plurality of source code modules by executing the first executable program module and wherein the profile information comprises information pertaining to invocation of procedures in the first executable program module;
determining module grouping information for the plurality of source code modules based on procedure invocation patterns in the profile information and according to one or more inter-procedural optimization heuristics, wherein determining the module grouping information comprises:

for each source code module:
- creating a module group for the source code module;
- designating the source code module as a primary module of the module group; and
- identifying all auxiliary modules of the module group, each of the identified auxiliary modules defining a callee procedure that is called by a caller procedure in the primary module of the module group, wherein identifying all auxiliary modules includes,
  - for each procedure in the primary module:
    - identifying all outgoing edges of the procedure that have an edge frequency count exceeding a threshold value, each of the outgoing edges representing a procedural call from the procedure to a second different procedure; and
    - for each of the identified outgoing edges:
      - identifying a callee procedure associated with the identified outgoing edge;
      - identifying a defining source code module of the identified callee procedure; and
      - designating the identified defining source code module as an auxiliary module of the primary module if the identified defining source code module has not already been so designated;
performing inter-procedural optimization based on the module grouping information to generate a plurality of object code modules, including
performing code transformation on at least one of the identified source code modules based on the identified auxiliary source code modules to create an optimized object code module according to the one or more inter-procedural optimization heuristics, and inlining procedures from the identified auxiliary source code modules into the identified source code module in the plurality of source code modules; and
generating a second executable program module based on the plurality of object code modules.

* * * * *